United States Patent
Kaneko

(10) Patent No.: US 9,411,202 B2
(45) Date of Patent: Aug. 9, 2016

(54) LIQUID CRYSTAL DISPLAY DEVICE

(75) Inventor: Bunkichi Kaneko, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 16 days.

(21) Appl. No.: 13/982,241

(22) PCT Filed: Jan. 12, 2012

(86) PCT No.: PCT/JP2012/050450
§ 371 (c)(1),
(2), (4) Date: Jul. 26, 2013

(87) PCT Pub. No.: WO2012/102087
PCT Pub. Date: Aug. 2, 2012

(65) Prior Publication Data
US 2013/0314657 A1 Nov. 28, 2013

(30) Foreign Application Priority Data
Jan. 27, 2011 (JP) .................................. 2011-014975

(51) Int. Cl.
| | | |
|---|---|---|
| *G02F 1/1345* | (2006.01) | |
| *G02F 1/1333* | (2006.01) | |
| *G02F 1/1343* | (2006.01) | |

(52) U.S. Cl.
CPC ........ G02F 1/1345 (2013.01); G02F 1/133308 (2013.01); *G02F 1/13458* (2013.01);
(Continued)

(58) Field of Classification Search
CPC .................. G02F 2001/133334; G02F 1/1345; G02F 2202/22; G02F 1/133308; G02F 1/13458
USPC .......................................................... 349/139
See application file for complete search history.

(56) References Cited

U.S. PATENT DOCUMENTS

| | | | | |
|---|---|---|---|---|
| 4,367,923 A | * | 1/1983 | Ishikawa | 349/68 |
| 5,283,677 A | * | 2/1994 | Sagawa et al. | 349/150 |

(Continued)

FOREIGN PATENT DOCUMENTS

| | | |
|---|---|---|
| CN | 1542527 A | 11/2004 |
| CN | 101470217 A | 7/2009 |

(Continued)

OTHER PUBLICATIONS

International Search Report issued in International Application No. PCT/JP2012/050450 mailed Mar. 13, 2012.
(Continued)

*Primary Examiner* — Lucy Chien
(74) *Attorney, Agent, or Firm* — McDermott Will & Emery LLP

(57) ABSTRACT

A liquid crystal display device less influenced by static electricity comprises a liquid crystal display element which forms a display part having inner surfaces of a pair of insulating substrates provided with transparent electrodes; a circuit substrate conductively connected to the liquid crystal display element via a lead terminals; and a conductive part formed to surround the transparent electrode. The conductive part is provided on the insulating substrate so as to avoid the positions where the lead terminals are arranged. Further included are a display panel through which the display part is visible; a first earth terminal conductively connected a first conductive pattern of the conductive part and in contact with the display panel; and a second earth terminal of which is conductively connected to a seventh conductive pattern of the conductive part to a grounding part.

4 Claims, 5 Drawing Sheets

(52) U.S. Cl.
CPC . *G02F1/134327* (2013.01); *G02F 2001/13332* (2013.01); *G02F 2001/133334* (2013.01); *G02F 2202/22* (2013.01)

(56) References Cited

U.S. PATENT DOCUMENTS

| | | | |
|---|---|---|---|
| 5,675,396 A * | 10/1997 | Tsunehiro | 349/59 |
| 6,108,066 A * | 8/2000 | Yanagawa et al. | 349/141 |
| 6,160,349 A * | 12/2000 | Nagai | 315/85 |
| 6,359,390 B1 * | 3/2002 | Nagai | 315/169.1 |
| 6,362,860 B1 * | 3/2002 | Sagawa | 349/59 |
| 6,525,786 B1 * | 2/2003 | Ono | 349/40 |
| 6,597,414 B1 * | 7/2003 | Hasegawa | 349/40 |
| 6,768,532 B1 * | 7/2004 | Sekiguchi | 349/153 |
| 2001/0012084 A1 * | 8/2001 | Ohta et al. | 349/141 |
| 2006/0040520 A1 | 2/2006 | Moh | |
| 2007/0292666 A1 * | 12/2007 | Higashino | 428/208 |
| 2008/0062373 A1 * | 3/2008 | Kim | G02F 1/1345 349/151 |
| 2008/0068550 A1 * | 3/2008 | Chang et al. | 349/143 |
| 2009/0207126 A1 * | 8/2009 | Arisato et al. | 345/102 |
| 2009/0310052 A1 | 12/2009 | Huang et al. | |
| 2010/0182524 A1 | 7/2010 | Nomura | |
| 2010/0203924 A1 | 8/2010 | Hirota | |
| 2011/0261310 A1 * | 10/2011 | Kojima | G02F 1/133308 349/151 |
| 2012/0218491 A1 * | 8/2012 | Min | G02F 1/133308 349/58 |

FOREIGN PATENT DOCUMENTS

| | | |
|---|---|---|
| JP | 11-185991 A | 7/1999 |
| JP | 2004-233890 A | 8/2004 |
| JP | 2006-139100 A | 6/2006 |
| JP | 2007-328922 A | 12/2007 |
| JP | 2008-170812 A | 7/2008 |
| JP | 2010-151852 A | 7/2010 |
| WO | 2008/029906 A1 | 3/2008 |

OTHER PUBLICATIONS

Chinese Examination Report issued in corresponding Chinese Patent Applicaiton No. 201280006300.X, mailed on Apr. 10, 2015.
Communication pursuant to Article 94(3) EPC, issued in corresponding European Patent Application No. 12739657.0, mailed on Sep. 30, 2015.

* cited by examiner

LIQUID CRYSTAL DISPLAY DEVICE

RELATED APPLICATIONS

This application is the U.S. National Phase under 35 U.S.C. §371 of International Application No. PCT/JP2012/050450, filed on Jan. 12, 2012, which in turn claims the benefit of Japanese Application No. 2011-014975, filed on Jan. 27, 2011, the disclosures of which Applications are incorporated by reference herein.

TECHNICAL FIELD

The present invention relates to a liquid crystal display device comprising a liquid crystal display element having a predetermined display portion, a circuit board disposed behind the liquid crystal display element, and a plurality of lead terminals provided along one end edge of the liquid crystal display element to conductively connect the liquid crystal display element and circuit board.

BACKGROUND ART

As such type of a conventional liquid crystal display device, the one described in the Patent Literature 1, for example, has been known. The liquid crystal display device described in the Patent Literature 1 comprises an upper glass substrate that is a pair of insulating substrates sealing a liquid crystal, a substantially rectangular liquid crystal display element that forms a display portion by providing transparent electrodes on the inside surface of a lower glass substrate, a circuit board that is conductively connected to the liquid crystal display element through a plurality of metal lead terminals, that is, connecting members, and a conductive part comprising a substantially frame-shaped conductive pattern formed so as to surround the transparent electrodes, wherein the plurality of lead terminals are provided along one end edge of the lower glass substrate, and the conductive part is formed in a substantially frame shape on the inside surface of the lower glass substrate so as to avoid the disposed positions of the lead terminals.

Further, in this case, an upper polarizing plate is affixed to the upper surface of the upper glass substrate, and a lower polarizing plate is affixed to the lower surface of the lower glass substrate, so that when a voltage is applied to a part where the transparent electrodes provided on both glass substrates are overlapped, alignment of the liquid crystal changes in that part, and light is blocked or transmitted by the upper polarizing plate and lower polarizing plate, enabling display with the liquid crystal. For example, when a liquid crystal display device is applied to a vehicle instrument, vehicle information such as a vehicle speed and engine speed is displayed on the liquid crystal display device.

CITATION LIST

Patent Literature

Patent Literature 1: Japanese Unexamined Patent Application Publication No. 2008-170812

SUMMARY OF THE INVENTION

Problems to be Solved by the Invention

When the liquid crystal display device described in the above Patent Literature 1 is applied to a vehicle instrument, a display panel (a front panel) having a display portion such as an indicator display portion may be provided in front of the liquid crystal display device. The display panel uses a lamellar light-transmissive substrate made of polycarbonate as a base material, and a black printed layer, for example, is formed behind the portion of the light-transmissive substrate except the central area of the light-transmissive substrate. The vehicle information that is a display portion formed in the liquid crystal display element can be seen from a viewer through a through portion that is a vent print portion where the black printed layer is not formed.

However, if a clearance between the through portion provided in the substantially central portion of the display panel and the liquid crystal display element provided behind the display panel (the through portion) is about several millimeters, when a human hand touches the area near the center of the front surface of the through portion, for example, the light-transmissive substrate (the through portion) is electrostatically charged because the polycarbonate resin composing the light-transmissive substrate as a base material of the display panel is comparatively easy to be electrostatically charged. When the static electricity charged in the area near the center of the through portion propagates to the downward circuit board, an element driving circuit mounted on the circuit board to drive the liquid crystal display element is broken, and the liquid crystal display element malfunctions (falsely displays). There is room for further improvement to solve this problem.

Accordingly, it is an object of the present invention to provide a liquid crystal display device that a liquid crystal display element does not malfunction under the influence of static electricity.

Means for Solving the Problem

A characteristic of the present invention is summarized in that a liquid crystal display device comprising: a liquid crystal display element that forms a display portion by providing a transparent electrode on an inside surface of a pair of insulating substrates sealing a liquid crystal; a circuit board that is conductively connected to the liquid crystal display element through a predetermined connection member; and a conductive part that is formed so as to surround the transparent electrodes, wherein the conductive part is provided on one of the pair of insulating substrates so as to avoid a disposed position of the connection member, the liquid crystal display device comprising: a front panel having a through portion or a penetrated portion that enables visual recognition of the display portion, a first grounding part whose one end side is conductively connected to a predetermined portion of the conductive part, and the other end side abuts the front panel; and a second grounding part whose one end side is conductively connected to the other portion of the conductive part different from the predetermined portion, and the other end side is conductively connected to a grounding part provided on the circuit board.

Further, a characteristic of the present invention is summarized in that the liquid crystal display device wherein: the connection member comprises a plurality of lead terminals provided on one of the insulating substrates so as to conductively connect the liquid crystal display element and the circuit board, and the first and second grounding parts comprise first and second grounding terminals provided on one of the insulating substrates in a state of being juxtaposed with the lead terminal.

Furthermore, a characteristic of the present invention is summarized in that the liquid crystal display device, wherein the other end side of the first grounding part abuts the front panel in a state of having elasticity.

Further, a characteristic of the present invention is summarized in that the liquid crystal display device, wherein the first grounding part is provided with a connection part that is conductively connected to the grounding part.

Effect of the Invention

According to the present invention, it is possible to provide a liquid crystal display device that a liquid crystal display element does not malfunction under the influence of static electricity.

DESCRIPTION OF EMBODIMENTS

Hereinafter, an explanation will be given of an embodiment of the present invention applied to a digital speed meter installed in a vehicle instrument, for example, with reference to the FIG. 1 to FIG. 6.

Figure 1:
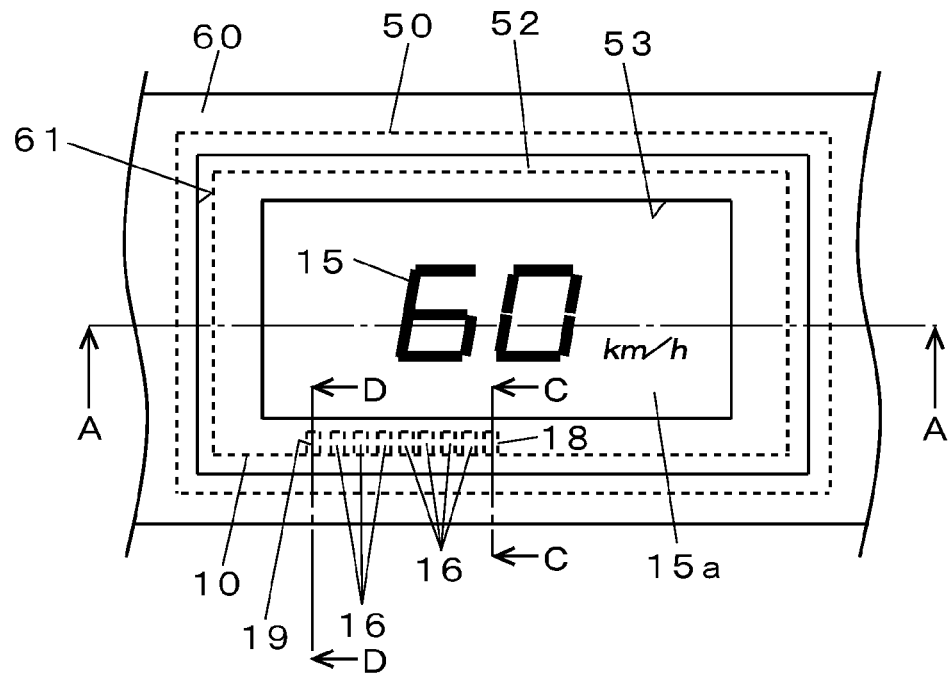
FIG. 1 is a front view of a liquid crystal display device according to an embodiment of the present invention.
Figure 2:
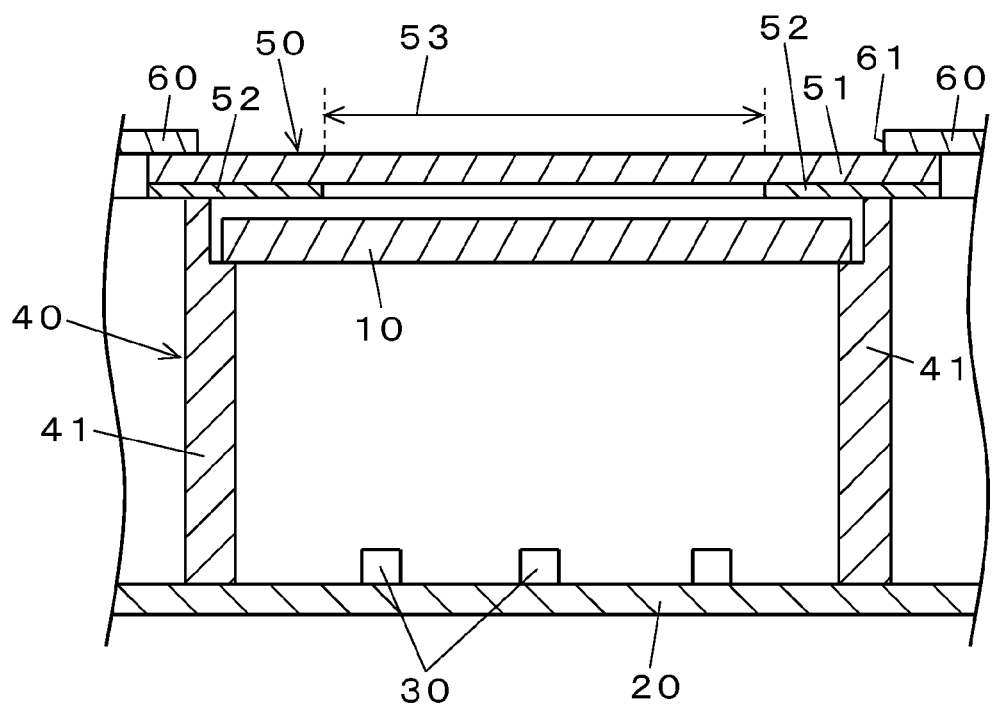
FIG. 2 is a sectional view taken along a line A-A of FIG. 1.

In FIG. 1 and FIG. 2, a digital speed meter as a liquid crystal display device according to the embodiment comprises a liquid crystal display element 10, a circuit board 20 that is disposed behind the liquid crystal display element 10 and is conductively connected to the liquid crystal display element 10 through a lead terminal 16 that is a connection member to be described later, a light source 30 mounted on the circuit board 20, a case body 40 disposed between the liquid crystal display element 10 and circuit board 20, a display panel (a front panel) 50 disposed in front of the liquid crystal display element 10 so as to cover the liquid crystal display element 10, and a flap member 60 to cover a peripheral edge of the display panel 50.

Figure 3:
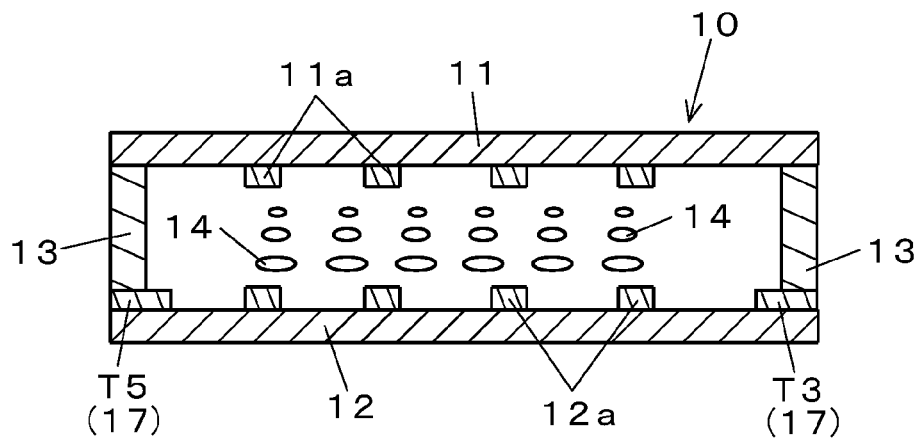
FIG. 3 is a magnified sectional view of a liquid crystal display element in FIG. 2.

As shown in FIG. 3, the liquid crystal display element 10 is configured to connect the peripheries of the upper insulting substrate 11 and lower insulating substrate 12 with a sealing material 13, and to seal a liquid crystal 14 between the insulating substrates 11 and 12 more inside the sealing material 13. The insulating substrates 11 and 12 are made of rectangular transparent glass substrates. An upper polarizing plate (not shown) is provided on the upper surface of the upper insulating substrate 11, and a lower polarizing plate (not shown) is provided on the lower surface of the lower insulating substrate 12.

A first transparent electrode 11a that is a transparent electrode having a predetermined shape is provided on the inside surface of the upper insulating substrate 11 (namely, on the surface of the upper insulating substrate 11 opposing the lower insulating substrate 12). A second transparent electrode 12a that is a transparent electrode having a predetermined shape is provided on the inside surface of the lower insulating substrate 12 (namely, on the surface of the lower insulating substrate 12 opposing the upper insulating substrate 11) so as to oppose (correspond to) the first transparent electrode 11a.

The first transparent electrode 11a and second transparent electrode 12a are arranged on the inside surfaces of the insulating substrates 11 and 12 so as to hold the liquid crystal 14. The planar shapes of the transparent electrodes seem substantially the same from a viewer (when looking straight at the liquid crystal display device). The portions of the display surface area of the liquid crystal display element 10 corresponding to the first transparent electrode 11a and second transparent electrode 12a form a display portion 15 that forms a display pattern. In other words, this means that the display portion 15 is formed by providing the transparent electrodes 11a and 12a on the inside surfaces of the insulating substrates 11 and 12, respectively, so as to face each other.

Of the upper insulating substrate 11 and lower insulating substrate 12, in the lower insulating substrate 12, a plurality of metal lead terminals 16 is fixed along one end edge. In this embodiment, each lead terminal 16 is centrally provided in a part of one end edge of the lower insulating substrate 12, thereby conductively connecting the liquid crystal display element 10 and circuit board 20.

Although a detailed illustration is omitted, the shape of each lead terminal 16 is substantially the same as the shape of a second lead terminal to be described later. The lead terminal 16 has a holding part and a lead portion. The holding part of the lead terminal 16 is formed in a U-shape, and is electrically connected to the second transparent electrode 12a when it holds the end of the lower insulating substrate 12. The end portion of the lead terminal 16 is electrically connected to a wiring (not shown) provided in the circuit board When a voltage corresponding to an external measurand is applied across the transparent electrodes 11a and 12a through the lead terminal 16, a measurand (for example, a vehicle speed) corresponding to a vehicle operating state is digitally displayed black in the display portion 15. In the liquid crystal display element 10, the background area 15a except the display portion 15 is illuminated by lighting of the light source 30 mounted on the circuit board 20.

Figure 4:
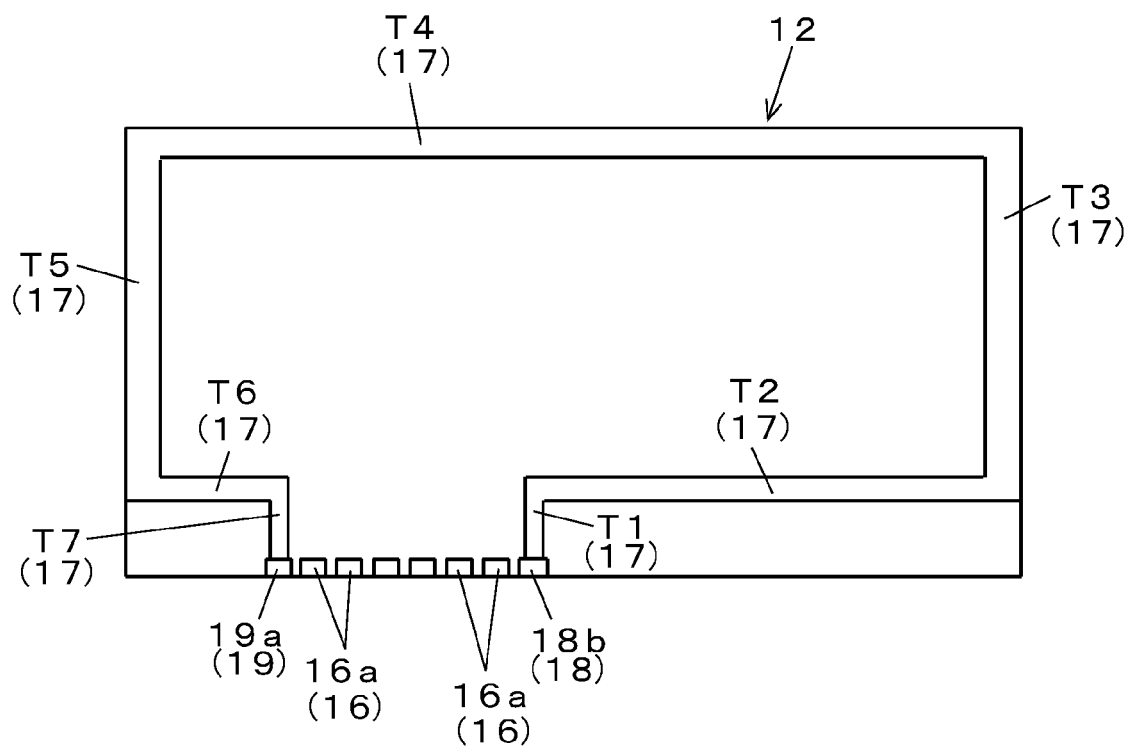
FIG. 4 is a front view of a lower glass substrate provided with first and second lead terminals, the lead terminals of the same embodiment.

Of the insulating substrates 11 and 12, on the inside surface of the lower insulating substrate 12, a conductive part 17 comprising a substantially frame-shaped conductive pattern is formed so as to surround the second transparent electrode 12a. The conductive part 17 is formed in a substantially frame shape on the inside surface of the lower insulating substrate 12 so as to avoid the disposed position of the lead terminal 16 (see FIG. 4). In FIG. 4, the transparent electrode 12a is formed inside the conductive part 17 (in the substantially central area of the lower insulating substrate 12), but an illustration of the transparent electrode 12a is omitted.

In particular, the conductive part 17 comprises a first conductive pattern T1 whose one end side is conductively connected to a first grounding terminal to be described later and the other end side is located between the first grounding terminal and transparent electrode 12a, a second conductive pattern T2 that is formed by routing from the first conductive pattern T1 opposite to the part connected to the first grounding terminal to the right side of the lower insulating substrate 12, a third conductive pattern T3 that is formed by routing along the right end surface of the lower insulating substrate 12, a fourth conductive pattern T4 that is formed by routing along the upper end surface of the lower insulating substrate 12, a fifth conductive pattern T5 that is formed by routing along the left end surface of the lower insulating substrate 12, a sixth conductive pattern T6 that extends from the lower end of the fifth conductive pattern T5 toward the second conductive pattern T2 without contacting the second conductive pattern T2, and a seventh conductive pattern T7 that conductively connects the sixth conductive pattern T6 and second grounding terminal to be described later.

Further, on the right side of each lead terminal 16, a first grounding terminal 18 that is a first grounding part is provided in the lower insulating substrate 12 a state of being juxtaposed with each lead terminal 16. The first grounding terminal 18 is made of metal material like each lead terminal 16, and has a holding part 18a conductively connected to the first conductive pattern T1 of the conductive part 17, and a contact piece 18b formed by bending in a substantially U-shape (see FIG. 5).

The holding part 18a is formed in a substantially U-shape, and is electrically connected to the first conductive pattern T1 by holding the end of the lower insulating substrate 12. On the other hand, the contact piece 18b is configured so that its distal end side contacts (abuts) the back of a display panel 50 (a ground color part 52), and has a function of propagating static electricity charged in the display panel 50 to the conductive part 17 (the first conductive pattern T1) through the holding part 18a of the first grounding terminal 18.

In other words, in this embodiment, the first grounding terminal 18 is configured so that one end side that is the holding part 18a is conductively connected to the first conductive pattern T1 of the conductive part 17, and the other end side that is a front end of the contact piece 18b abuts the display panel 50.

On the other hand, on the left side of each lead terminal 16 that is the opposite side to the first grounding terminal 18, the second grounding terminal 19 that is the second grounding part is provided in the lower insulating substrate 12 a state of being juxtaposed with each lead terminal 16. The second grounding terminal 19 is made of metal material like each lead terminal 16 and first lead terminal 18, and has a holding part 19a of the same shape as the holding part 18a of the first grounding terminal 18, and a linear lead part 19b formed by suspending downward the holding part 19a (namely, toward the circuit board 20) (see FIG. 6).

The holding part 19a is formed in a substantially U-shape, and is electrically connected to the seventh conductive pattern T7 of the conductive part 17 by holding the end of the lower insulating substrate 12. On the other hand, the front end of the lead part 19b that is located opposite to the holding part 19a is electrically connected to a grounding part to be described later provided in the circuit board 20.

In other words, in this embodiment, the second grounding terminal 19 is configured so that one end side that is the holding part 19a is conductively connected to the seventh conductive pattern T7 of the conductive part 17, and the other end that is a front end of the lead part 19b is conductively connected to the grounding part.

Figure 5:
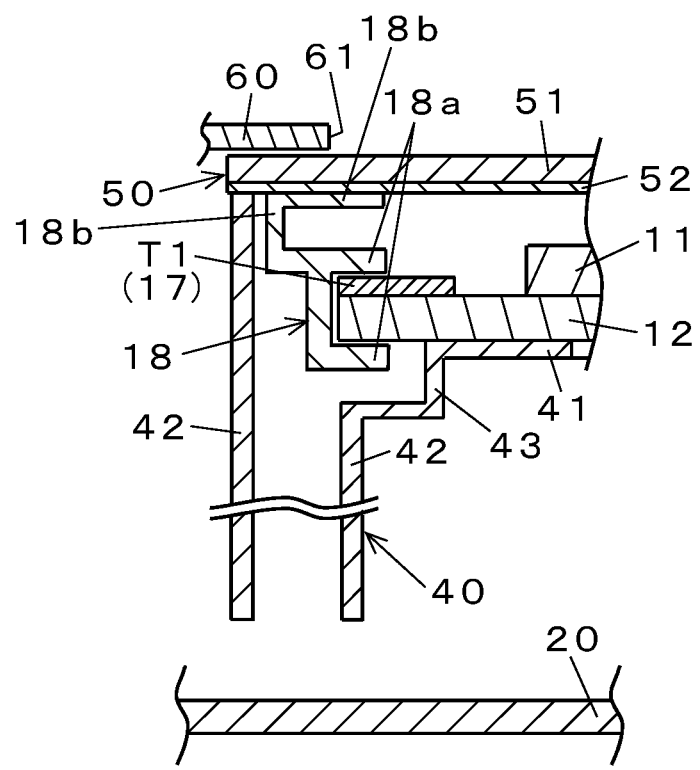
FIG. 5 is a sectional view taken along a line C-C of FIG. 1.
Figure 6:
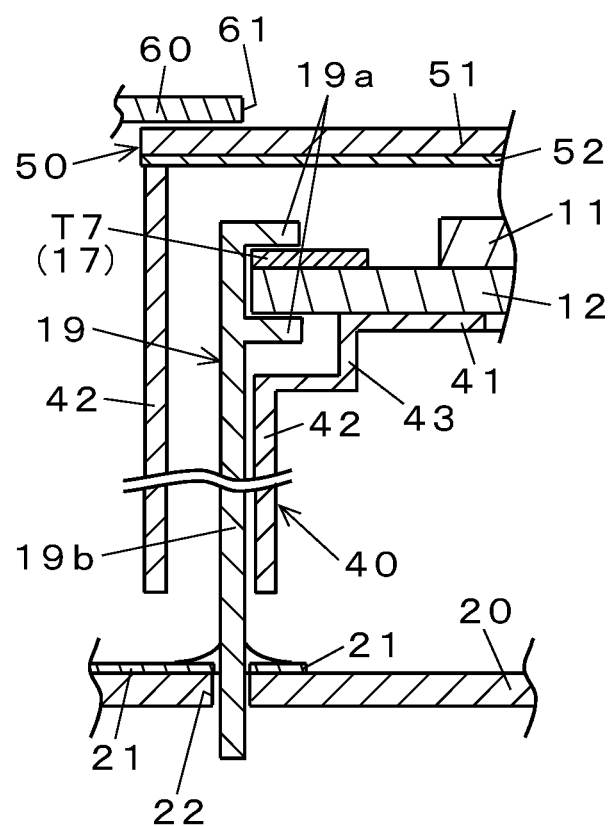
FIG. 6 is a sectional view taken along a line D-D of FIG. 1.

Therefore, when the display panel 50 electrostatically charged, the static electricity charged in the display panel 50 propagates to the conductive part 17 (namely, propagates sequentially to the first to seventh conductive patterns T1 to T7) through the contact piece 18b and holding part 18a of the first grounding terminal 18, and then flows to the grounding part provided in the circuit board 20 through the holding part 19a and lead part 19b of the second grounding terminal 19 that is conductively connected to the seventh conductive pattern T7 (see FIG. 4 to FIG. 6).

The circuit board 20 is made of a rigid circuit board provided with a wiring part formed on a glass epoxy resin base material, for example, in which the wiring part is conductively connected to a light source 30, an element driving circuit (not shown) to drive the liquid crystal display element 10, and various circuit components such as a resistor and a capacitor (not shown).

A reference numeral 21 denotes a grounding part comprising a grounding pattern provided on the front surface of the circuit board 20. The grounding part 21 is conductively connected to the lead part 19b of the second grounding terminal 19. In this case, a hole 22 penetrating the front and back of the circuit board 20 is provided at a portion of the circuit board 20 corresponding to the lead part 19b, and the front end of the lead part 19b penetrates through the hole 22, and projects to the back of the circuit board 20. In other words, the grounding part 21 is formed as a pattern on the front (or back) of the circuit board 20 that is a periphery of the hole 22, and is electrically connected to the lead part 19b by soldering or the like.

The light source 30 is comprised of a chip type light-emitting diode to emit an appropriate color, for example, and is comprised of a light-emitting body, which is mounted on the wiring part provided on the circuit board 20, and supplies illumination light to the liquid crystal display element 10. The illumination light from the light source 30 illuminates the background area 15a except the display portion 15 by transmitting through there.

The case body 40 is made of white synthetic resin, for example, and has a function as a supporter to support the liquid crystal display element 10 and display panel 50, a function as a reflector to reflect the illumination light from the light source 30 to the liquid crystal display element 10, and a function as a terminal holder to guide and hold each lead terminal 16 and second grounding terminal 19.

Such a case body 40 comprises a substantially frame-shaped base part 41 to support the liquid crystal display element 10 and display panel 50, a plurality of terminal holders 42 to guide and hold each lead terminal 16 and second grounding terminal 19, and a connection part 43 to connect the base part 41 and terminal guide 42, which are formed in one body.

Each terminal holder 42 is formed substantially in a frame shape, and is configured to guide the lead part of each lead terminal 16 and the lead part 19b of the second grounding terminal 19. FIG. 6 shows only the terminal holder 42 corresponding to the lead part 19b of the second grounding terminal 19. It is needless to say that the terminal holder 42 corresponding to the lead part of each lead terminal 16 has the same shape as the lead part 19b.

The display panel 50 comprises a design panel provided with a display design such as an indicator display portion (not shown), and uses a light-transmissive substrate 51 made of polycarbonate as a base material. On the back of the light-transmissive substrate 51, a ground color part 52 made of a blacked print layer is formed by printing using a means of screen printing, etc.

In this case, in the central area of the ground color part 52 corresponding to the display portion 15 of the liquid crystal display element 10, a substantially rectangular through portion 53, which is a vent print part where the black printed layer forming the ground color part 52 is not formed, is provided. Therefore, when a viewer looks straight at the liquid crystal display device from the front side of the liquid crystal display device, a viewer can see (visually recognize) display of the display portion 15 of the liquid crystal display element 10 through the through portion 53 provided in the display panel 50.

Further, in this case, a clearance between the through portion 53 formed in the central area of the display panel 50 and the liquid crystal display element 10 (the upper insulating substrate 11) disposed behind the display panel 50 (the through portion 53) so as to be parallel to the display panel 50 should be set to several millimeters. The base color part 52 may be formed by printing on the front surface of the light-transmissive substrate 51, not on the back of the light-transmissive substrate 51, or the display panel 50 may be formed as a panel body not provided with the display design. Further, if necessary, a diffusing plate (not shown) for evenly diffusing the illumination light from the light source 30 may be provided between the display panel 50 and circuit board 20.

The flap member 60 is made of black synthetic resin, for example, and is disposed on the display panel 50 so as to cover essential parts of the display panel 50, and is provided with an opening 61 comprised of an open window corresponding to the through portion 53.

The liquid crystal display device comprises the parts described above. In such a configuration, static electricity charged on the display panel 50 (the light-transmissive substrate 51) when a human hand touches the area near the center of the front surface of the through portion 53 of the display panel 50, for example, sequentially propagates to the contact piece 18b abutting the display panel 50 and the holding part 18a of the first grounding terminal 18, the first conductive pattern T1 that is a predetermined portion of the conductive part 17, second conductive pattern T2, third conductive pattern T3, fourth conductive pattern T4, fifth conductive pattern T5 and sixth conductive pattern T6, which are predetermined parts of the conductive part 17, the seventh conductive pattern T7 that is the other portion of the conductive part 17 different from the predetermined portion, and the holding part 19a and lead part 19b of the second grounding terminal 19, and then positively flows finally to the grounding part 21 that is a grounding pattern of the circuit board 20 conductively connected to the lead part 19b. This suppresses the element driving circuit from being damaged by static electricity, and eliminates the possibility of malfunction (display error) of the liquid crystal display element 10 under the influence of static electricity, thereby providing a liquid crystal display device with improved display quality.

As described above, in this embodiment, a liquid crystal display device comprises a liquid crystal display element 10 that forms a display portion 15 by providing transparent electrodes 11a and 12a on the inside surface of a pair of insulating substrates 11 and 12 sealing a liquid crystal 14, a circuit board 20 that is conductively connected to the liquid crystal display element 10 through a plurality of metal lead terminals 16, and a conductive part 17 formed so as to surround the transparent electrode 12a, wherein the the conductive part 17 is provided on one insulating substrate 12 so as to avoid a disposed position of the lead terminal 16, the liquid crystal display device comprising a display panel 50 having an through portion 53 that enables visual recognition of the display portion 15, a first grounding terminal 18 whose one end side is conductively connected to a first conductive pattern T1 of the conductive part 17 and the other end side abuts the display panel 50, and a second grounding terminal 19 whose one end side is conductively connected to a conductive pattern T7 of the conductive part 17 and the other end side is conductively connected to a grounding part 21 provided on the circuit board 20. A plurality of lead terminals 16 that are connecting members is provided on the lower insulating substrate 12 so as to conductively connect the liquid crystal display element 10 and circuit board 20, and the second grounding terminals 18 and 19 that are first and second grounding parts are provided on the lower insulating substrate 12 in a state of being juxtaposed with each lead terminal 16.

Therefore, static electricity charged in the display panel 50 when a human hand touches the area near the center of the front surface of the through portion 53 propagates to the contact piece 18b contacting (abutting) the display panel of the first grounding terminal 18 without propagating to the liquid crystal display element 10, and the static electricity propagated to the contact piece 18b propagates to the conductive part 17 comprised of conductive patterns and formed so as to surround the display portion 15 through the holding part 18a. And, the static electricity propagated to the conductive part 17 positively flows finally to the grounding part 21 comprised of grounding patterns and conductively connected to the lead part 19b through the holding part 19a and lead part 19b of the second grounding terminal 19 conductively connected to the conductive part 17. This eliminates the possibility of malfunction of the liquid crystal display element 10 under the influence of static electricity, thereby providing a liquid crystal display device with improved display quality.

Further, in this embodiment, an explanation has been given of the aspect that the contact piece 18b located in the other end side of the first grounding terminal 18 is formed by bending in a U-shape so as to abut the display panel 50. However, the contact piece 18b can be formed in any shape able to contact (abut) the display panel 50, for example, the contact piece 18b can be formed in a spiral (helical) shape or in zigzag (S-shape).

Further, the contact piece 18b located in the other end side of the first grounding terminal 18 is desirably configured to always abut the display panel 50 in a state of having elasticity to give a tension (a pressing elastic force) to the display panel. As the contact piece 18b abuts the display panel 50 in a state of having elasticity, the connection reliability between the first grounding terminal 18 and display panel 50 can be improved.

Further, in this embodiment, an explanation has been given of the aspect that the through portion 53 that enables viewing of the display portion 15 is formed in a part of the display panel 50 corresponding to the display portion 15. However, though a detailed illustration is omitted, it may be permitted to provide a penetrated portion consisting of a substantially rectangular through-hole in a part of the display panel 50 (namely, a part of the light-transmissive substrate 51) corresponding to the display portion 15, thereby enabling a viewer to visually recognize the display of the display portion 15 through the penetrated portion. At this time, the ground color part 52 may be provided in the back (or the front) of the light-transmissive substrate 51 except the penetrated portion.

Figure 7:
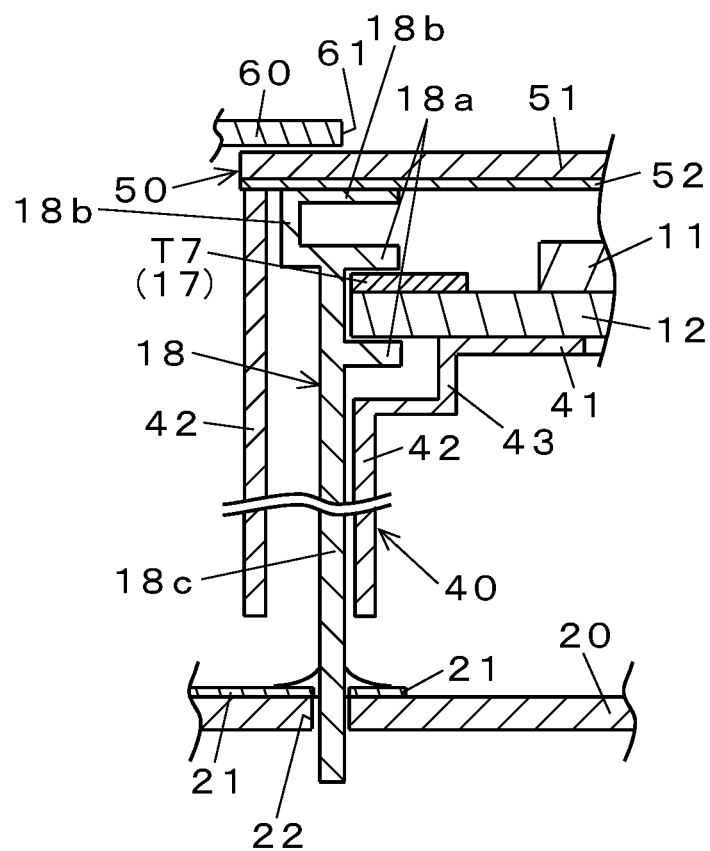
FIG. 7 is a sectional view showing essential parts of a liquid crystal display device according to a modification of the same embodiment.

Further, in this embodiment, an explanation has been given of the aspect that the first grounding terminal 18 is comprised of a holding part 18a, and a contact piece 18b. However, as shown in FIG. 7 illustrating a modification of the embodiment, the first grounding terminal 18 may be comprised of a holding part 18a, a contact piece 18, and a linear connection part 18c that is formed by suspending downward the holding part 18a close to the circuit board 20, and the connection part 18c may be conductively connected to the grounding part 21.

INDUSTRIAL APPLICABILITY

The present invention is applicable to a liquid crystal display device comprising a liquid crystal display element that forms a display portion by providing transparent electrodes on the inside surface of a pair of insulating substrates sealing a liquid crystal, and a circuit board that is conductively connected to the liquid crystal display element through a connection member comprised of a lead terminal.

DESCRIPTION OF REFERENCE NUMERALS

10 Liquid crystal display element
11 Upper insulating substrate (Insulating substrate)

11a First transparent electrode (Transparent electrode)
12 Lower insulating substrate (Insulating substrate)
12a Second transparent electrode (Transparent electrode)
14 Liquid crystal
15 Display portion
16 Lead terminal (Connection member)
17 Conductive part
18 First grounding terminal (First grounding part)
18a, 19b Holding part
18b Contact piece
18c Connection part
19 Second grounding terminal (Second grounding part)
19b Lead part
20 Circuit board
21 Grounding part
40 Case body
50 Display panel (Front panel)
51 Light-transmissive substrate
53 Through portion
60 Flap member
T1 First conductive pattern (Predetermined portion of conductive part)
T2 Second conductive pattern
T3 Third conductive pattern
T4 Fourth conductive pattern
T5 Fifth conductive pattern
T6 Sixth conductive pattern
T7 Seventh conductive pattern (Other portion of conductive part)

The invention claimed is:

1. A liquid crystal display device comprising:
a liquid crystal display element that forms a display portion disposing transparent electrodes on an inside surface of a pair of insulating substrates sealing a liquid crystal;
a circuit board that is conductively connected to the liquid crystal display element through a predetermined connection member; and
a conductive part that is formed so as to surround the transparent electrodes,
wherein the conductive part is provided on one of the pair of insulating substrates in a state of being separated with the connection member,
the liquid crystal display device further comprising:
a display panel having a through portion or a penetrated portion that enables visual recognition of the display portion,
a first grounding part whose one end side is conductively connected to a predetermined portion of the conductive part, and the other end side abuts the display panel; and
a second grounding part whose one end side is conductively connected to another portion of the conductive part different from the predetermined portion, and the other end side is conductively connected to a grounding part provided on the circuit board,
wherein the connection member comprises a plurality of lead terminals provided on one of the insulating substrates so as to conductively connect the liquid crystal display element and the circuit board,
the first and second grounding parts comprise first and second grounding terminals provided on one of the insulating substrates in a state of being juxtaposed with a respective lead of the plurality of lead terminals,
the display portion displays a measurand corresponding to a vehicle operating state,
the display panel is disposed in front of the liquid crystal display element, and
a contact piece provided on the first grounding terminal abuts the display panel.

2. The liquid crystal display device according to claim 1, wherein the other end side of the first grounding part abuts the front panel in a state of having elasticity.

3. The liquid crystal display device according to claim 1, wherein the first grounding part is provided with a connection part that is conductively connected to the grounding part.

4. The liquid crystal display device according to claim 1, wherein the first grounding terminal further includes a holding part, and
the holding part is formed in a substantially U-shape, and is conductively connected to the predetermined portion of the conductive part by holding an end of one of the insulating substrates.

* * * * *